Inventors
Alfred Krieg
James A. Bundy
By V. F. Lacagne
Att'y

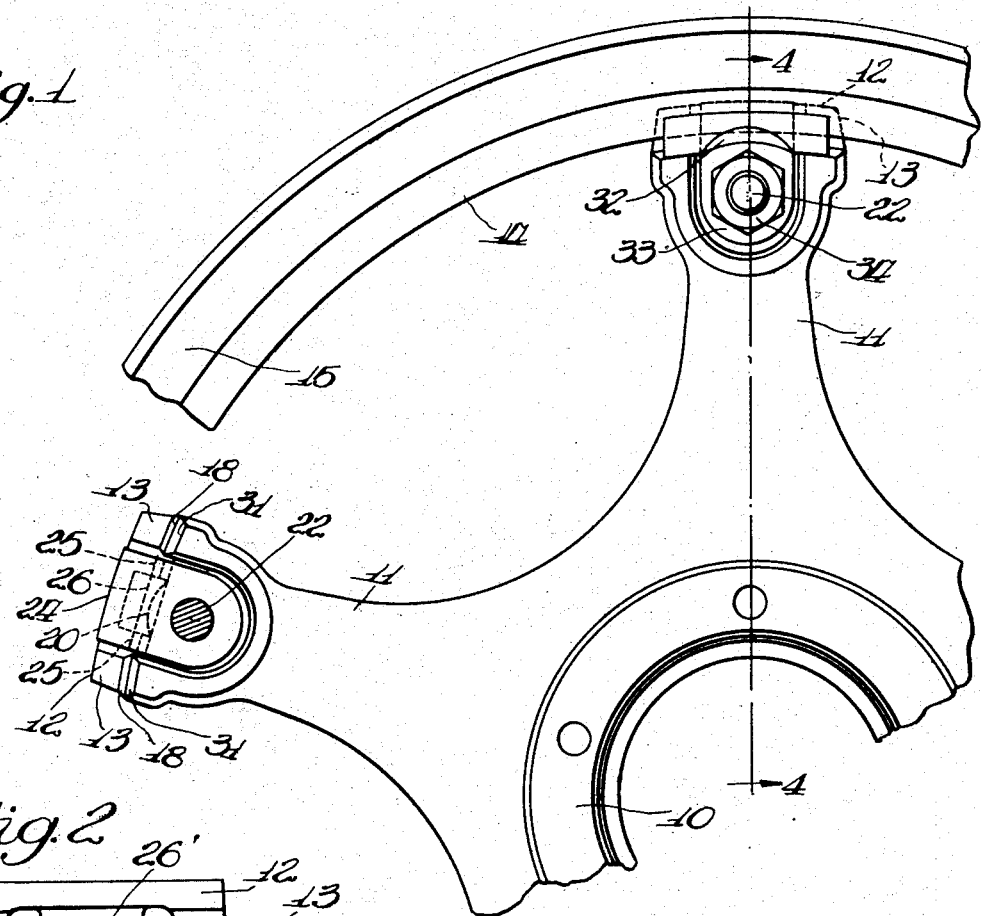
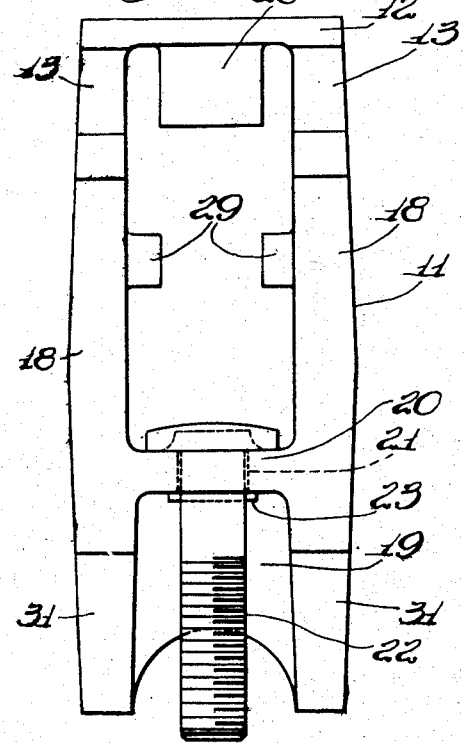
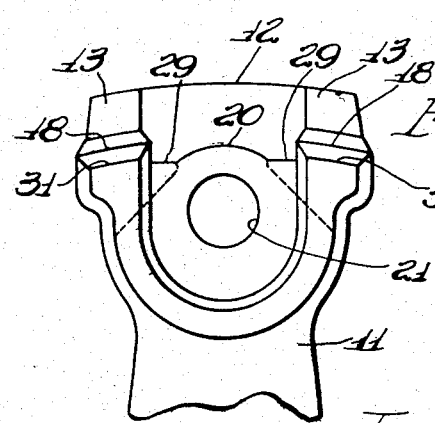

Inventors
Alfred Krieg
James A. Bundy
By V. F. [illegible]
Atty.

Patented May 21, 1935

2,002,290

UNITED STATES PATENT OFFICE 2,002,290

DUAL WHEEL MOUNTING

Alfred Krieg and James A. Bundy, Fort Wayne, Ind., assignors to International Harvester Company, a corporation of New Jersey Application December 23, 1933, Serial No. 703,796

5 Claims. (Cl. 301—12)

This invention relates to dual wheels, such as are commonly used for the rear wheels of motor trucks. It has become conventional practice to equip such wheels with dual pneumatic tires, and the present invention relates more particularly to a construction for removably mounting tire carrying rims on a cast metal spider, or wheel body, comprising a hub and hollow spokes radiating therefrom.

The principal object of the invention is to provide an improved construction by which the rims of a dual wheel may be easily applied to or removed from the spider or wheel body and by which the two rims will be held securely in position with an equal amount of pressure and will be properly spaced and centered on the wheel body. This object and others, which will be apparent from the detailed description to follow, are accomplished by a construction such as illustrated in the drawings, in which:

Figure 1 is a side elevation showing a portion of a wheel spider and a portion of the visible side of the rim mounted thereon;

Figure 2 is a plan view of the end of one of the spokes of the wheel shown in Figure 1;

Figure 3 is an enlarged view in elevation of one end of the spokes with the spacing element and rims removed;

Figure 4:
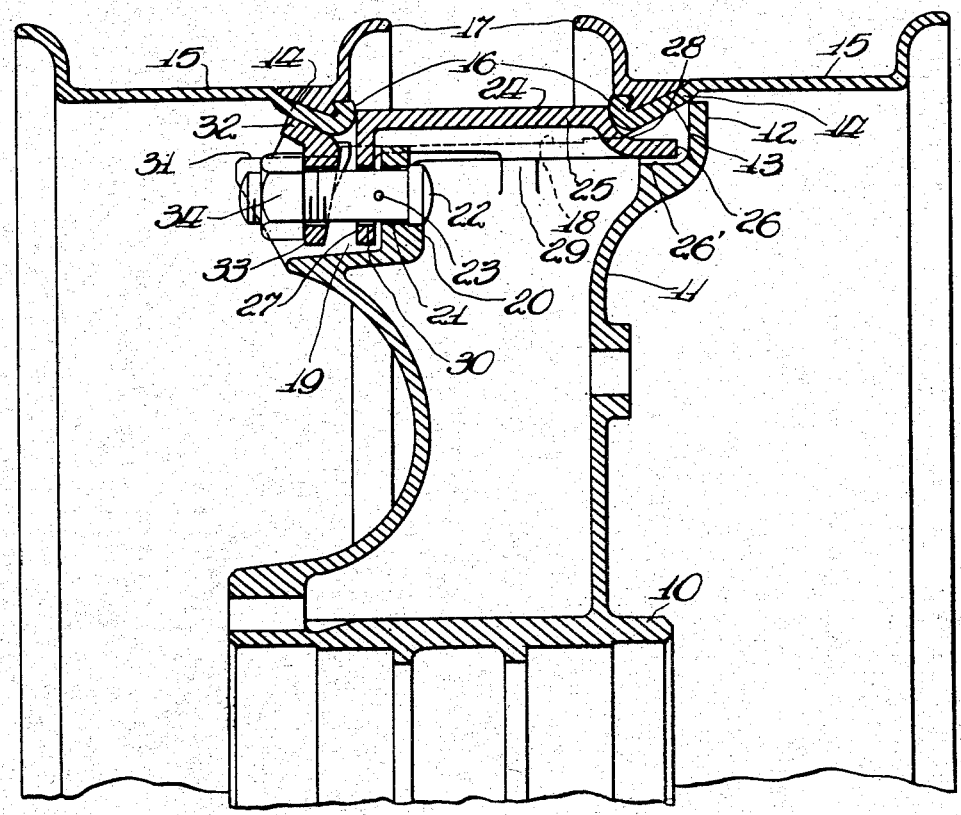
Figure 4 is a section taken on the line 4—4 of Figure 1.

Referring to the drawings, a conventional cast wheel has been illustrated, which consists essentially of a hub 10 and integrally hollow spokes 11 radiating therefrom. The hub and spokes constitute the wheel body or spider, as it is conventionally termed in this art. A wheel of this type is also known as the felloeless type, there being no connection between the ends of the spokes. Wheels of this type are also designated in connection with the rims as being constructed for spoke end mounted rims.

Figure 5:
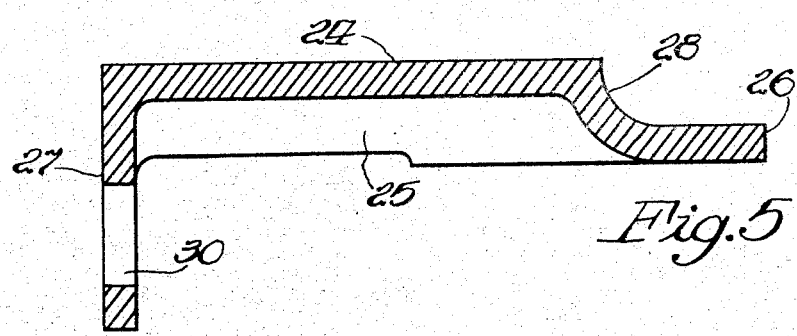
Figure 5 is an enlarged sectional view taken longitudinally through one of the spacing elements.
Figure 6:
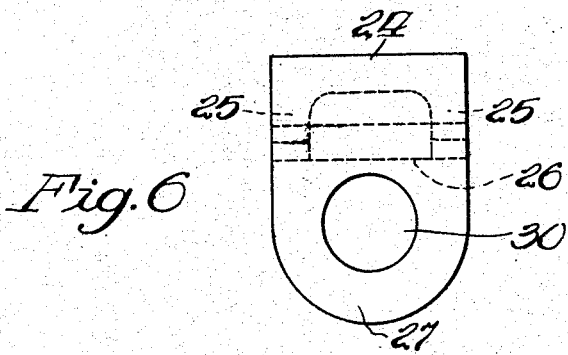
Figure 6 is an end view of a spacing element as shown in Figure 5.

As best shown in Figure 2, the hollow spoke 11 is extended in both axial directions at the outer end of the spoke. The portion of the spoke adjacent the inside of the wheel, that is, the side next to the vehicle, is formed with a flange 12 extending radially outwardly. At each end of said flange, a bevel seat 13 extends upwardly from the spoke end to the flange. These spaced seats 13 are formed to engage an inclined surface 14 formed on the rim 15. This rim 15 and also the outer rim to be hereinafter referred to are of a conventional construction now in wide use. The inclined surface 14 is formed on a specially rolled flange 16 shaped to receive a split locking ring 17 which secures the tire on the rim. It will be noted that the inner diameter of the main portion of the rim is substantially larger than the outside diameter of the upstanding flanges 12 on the spoke ends. This clearance is provided to assure the sliding of the rim over the spoke ends during assembly. Along each side of the end surface of the spoke, the radial faces 18 are substantially parallel to the axis of the wheel and lie within a circle substantially less in diameter than the inside diameter of the flange 16. This assures easy positioning of the inner tire rim over the spoke ends. At the outside of each spoke end, a peculiarly shaped pocket 19 is formed. Said pocket is open at the outside in an axial direction and is open at the top. A transverse portion 20 of the spoke end, which forms the inner wall of the pocket in an axial direction, is formed with an opening 21 through which a headed bolt 22 extends. The head of said bolt is flattened to engage a shoulder on the inner wall of the transverse portion to prevent its rotation. Within the pocket 19 and outside of the outside wall of the transverse portion 20, a cotter key 23 is positioned in an opening in the bolt, to prevent the bolt from dropping out of position during assembling operation. On each spoke end, a spacing member 24 is slidably fitted across the end of the spoke after the inside rim is in position. Said member, as shown in Figures 5 and 6, is formed with depending side flanges 25, an integrally extending tongue 26, and a radial extension 27. The tongue 26 during the assembling operation slips under the inside of the flange 16. A curved surface 28 formed on the member 24 where the tongue 26 joins with the main portion of the member abuts a curved surface formed on the flange 16. Midway between the two ends of the spoke centrally directed lugs 29 form supports for the side flanges 25 of the spacing member 24. The extension 27 of the spacing member is formed with an opening 30 through which the bolt 22 projects when the member is placed in position on the spoke end. As shown, the bolt 22 is loosely fitted, whereby certain freedom of movement is permitted; however, the cotter key 23 holds the bolt in position and the looseness of the fitting in the opening 21 permits only a definite amount of angular movement. By this construction the spacing members 24 are held in position during rotation of the wheel to successively place the members in position during assembling operation. This provides a very simple and economical construction for holding the spacing members in position until the outside rim is mounted on the wheel spider and clamped in position. As shown in Figure 3, the transverse portion 20 of the spoke end is arched upwardly to give sufficient strength for backing up the bolt 22. At each side of the arched portion 20, which extends upwardly between the side flanges 25 of the cross-member 24, seats are formed for said side flanges. The portions of the spoke end forming the side walls of the pocket 19 terminate in a pair of shoulders 31 which form spaced seats for a clamp 32. The upper portion of said clamp is formed as a circumferential wedge tapered inwardly toward the main body of the wheel. The lower side of the wedge engages the shoulders 31. The upper surface of the wedge engages the seating surface 14 formed on the flange 16 of the outer rim. It will be understood that the two rims are identical in construction, one being reversed with the flange 16 on the opposite side. A downward extension 33 on the clamp 32 is formed with an opening through which the clamping bolt 22 extends. A nut 34 engages the outer surface of the depending portion 33, the clamping lug being so shaped that the outer surface which the nut engages will lie in a plane substantially perpendicular to the axis of the wheel. The curved portion of the flange 16 of the outer rim engages the outer ends of the clamping members 14, which are formed with said outer end lying substantially in a plane perpendicular to the axis of the wheel.

In the above description of the embodiment of this invention, the assembly operation has been described in the order in which the parts were positioned in place. One difficulty with dual wheels which receives careful consideration in design is the cocking of the rims with respect to a plane perpendicular to the axis of the wheel, and the eccentricity of the rim with respect to the axis of the wheel. To overcome misalignment, due to either of these conditions, the clearances have been so constructed in this wheel and the design is such that any cocking or eccentricity is reduced to a minimum. After the inner rim is positioned in place, the spacing members 24 are placed in position with the tongues 26 pushed under the flange 16 of the inner rim. This automatically centers the rim within the limits defined by the clearance between the upper side of the tongues and the inside diameter of the flange 16. The outer rim 15 is then placed in position and is positively aligned by engaging the outer ends of the spacing members 24. The clearance of the inner diameter of the rim with respect to the side walls 18 of the spoke end is such that the wheel is very closely centered prior to the application of the wedges. As the wedges are then tightened in position, the centering is more accurately accomplished. Also, as the spacing members 24 are pushed against the flange 16 of the inner rim, said rim is securely clamped in position in very close alignment both with respect to the center plane of the wheel and with respect to the axis of the wheel.

Figure 7:
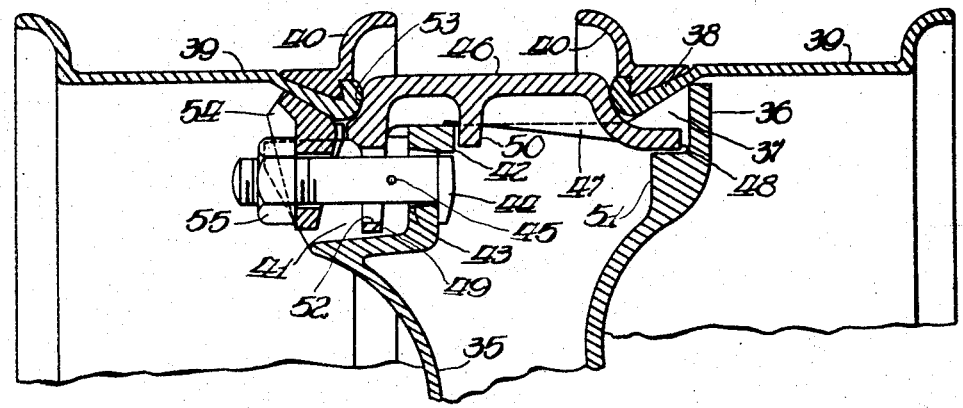
Figure 7 is a sectional view showing the end of the spoke and the rims of a modification.
Figure 8:
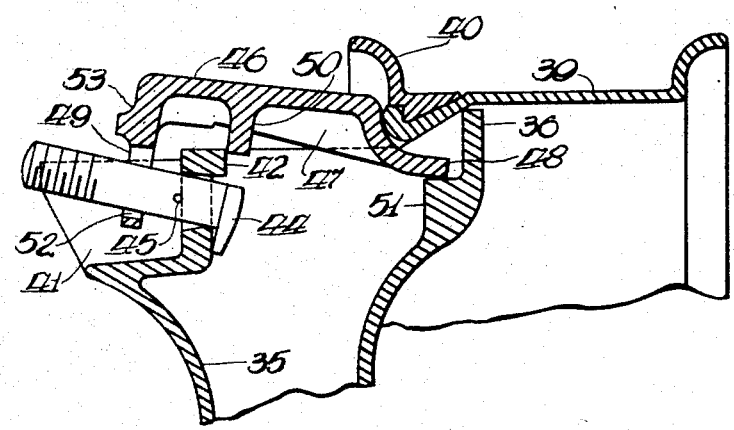
Figure 8 is a sectional view of the same modification shown in Figure 7, illustrating one of the spacer elements as it is being placed in position; and, Figure 9 is an end view of the spacer element utilized in the modification shown in Figures 7 and 8.
Figure 9:
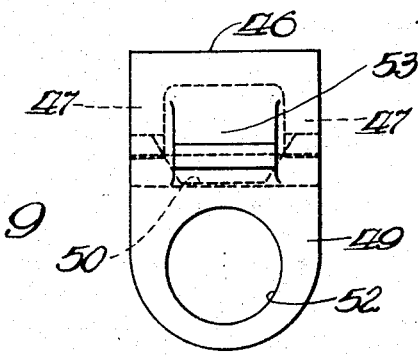

In the modification shown in Figures 7, 8 and 9, the hollow spoke ends 35 are provided at the edge adjacent the inside of the wheel,—that is, the side next to the vehicle,—with a flange 36 extending radially outwardly. At each end of the flange a bevel seat 37 extends upwardly from the spoke end to the flange. These spaced seats 37 are formed to engage an inclined seating surface 38 formed on the gutter portion of a rim 39. Said rim and also the other rim to be hereinafter referred to are of a conventional construction now in wide use. The gutter portion for the rim forms a retaining groove for the removable flange 40, which secures the tire on the rim and permits removal of the tire. As in the form of the wheel above described, the inner diameter of the main portion of the rim 39 is substantially larger than the outside diameter of the upstanding flanges 36.

At the outside edge of each spoke end, a pocket 41 is formed open at the outside in the axial direction and open at the top. A transverse portion 42 of the spoke end, which forms the inner wall of the pocket, is provided with an opening 43 through which a headed bolt 44 extends. The head of said bolt is flattened to engage a shoulder on the inner wall of the transverse portion to hold it against rotation. Within the pocket 41 and outside the wall 42, a cotter key 45 extends through the bolt to prevent it from dropping out of position during assembling.

A spacing member 46 is slidably fitted across the end of each bolt after the inner rim is in position. Said member is formed with depending side flanges 47 and a curved extending tongue 48 adapted to fit under the gutter portion of the rim 39, a downward extension 49 at the end opposite the tongue 48, and an intermediate, downwardly extending lug 50. As shown in Figure 8, the spacing elements 46 are successively inserted in position after the rim 39 is in place. The tongue 48 engages an abutting boss 51 inside the spoke end and the curved surface of the tongue engages the gutter on the rim. The parts are so proportioned that the depending lug 50 will slide over the transverse wall 42. The opening 43, through which the bolt 44 extends, is sufficiently large to permit the bolt to tilt upwardly to the position shown in Figure 8. An opening 52 in the downward extension 49 of the spacing member 46 is large enough to provide clearance for moving the spacing member into position over the bolt 44. As the spacing member reaches the position shown in Figure 8, it may be pushed inwardly with the lug 50 engaging the inner side of the wall 42. Pressure of the rim 39 outwardly against the spacing members is sufficient to hold them in position while the wheel is turned over as the sucessive spacing members are put into position. By this construction difficulties encountered in the form shown in Figures 1 to 6, inclusive, were overcome, as the spacing members remain in position in this form until the second rim 39 is placed in position with the rounded portion of the gutter engaging curved portions 53 on the spacing members. The conventional clamps 54 are then placed in position, said clamps abutting the inclined surface of the rim gutter and the upper edges of the side walls of the pockets 41. Said clamps are secured in position by nuts 55 on the bolts 44. After being clamped in position, the lugs 50 may be pulled away from abutment with the wall 42.

In the above description of the modified form of wheel shown in Figures 7, 8 and 9, the assembling operation has been described along with the description. In removing the tire rims from the wheels the procedure is the same in reverse order, the clamps being first removed and subsequently the spacing elements 46 being individually removed from the spoke ends.

Although applicants have shown and described a particular embodiment of their improved spoke end mounting for dual wheel rims, it is to be understood that they claim as their invention all modifications falling within the scope of the appended claims.

What is claimed is:

1. A dual wheel structure comprising a wheel body having spaced spokes extending therefrom, a shoulder formed on each spoke end, two rims mounted on the spoke ends, a spacer element mounted over each spoke end between the rims, and means for clamping the rims in position against the spacing elements and against the shoulders, said spacing elements having tongues projecting under one rim for centering the rim during assembly, and a lug at the other end engageable with a portion of the wheel structure to hold that end in position during assembling of the rims, inwardly projecting lugs being formed at the spoke end to support the spacing elements.

2. A wheel structure comprising a hub, spokes radiating from said hub, said spokes being formed at their ends with a face of a substantial axial length, a shoulder formed at the vehicle side of said face with an outwardly beveled seat, a clamping bolt extending through a portion of the spoke and axially outwardly, a rim fitted over the spoke ends, the rim being of a larger inside diameter than the greater radial dimension of the shoulders formed on the spoke ends, a beveled seat formed on said rim of less diameter than the spoke end and adapted to seat on the beveled seats formed on the spoke ends, a spacer element mounted on each spoke end, said element being slidable axially across the spoke end and having a tongue projecting under the beveled seat on the inside rim and being provided with an extension formed to engage a portion of the spoke end for holding the spacer against axial displacement during assembling, a shoulder formed on the spacer element positioned to exert axial pressure against said rim, said element being formed with an apertured depending lug being fitted over the clamping bolt, and means for clamping the spacer elements in position.

3. A dual wheel structure comprising a hub, spokes radiating from said hub, beveled seats formed on the spoke ends at one side of a central plane of the wheel structure, a tire rim fitted against said seats, a clamping bolt extending axially outwardly from each spoke end, transverse webs formed on each spoke end lying substantially in a plane at right angles to the axis of the wheel, a removable spacer element mounted on each spoke end, said spacer being provided with an extension formed to engage the transverse web for holding the spacer against axial displacement during assembly, said spacer being also provided with an apertured extension formed to be fitted over the clamping bolt as the spacer element is positioned during assembling, a second rim mounted on the spoke ends abutting the spacer elements, and clamps engaged by the clamping bolts for holding said rims in position on the spokes.

4. A dual wheel comprising a hub, spokes radiating from said hub, said spokes having beveled seats formed at one side of the ends thereof and pockets formed at the side opposite the seats, an inner rim mounted on the beveled seats, a spacer element positioned at each spoke end, said element having a shoulder abutting the inner rim, and a depending lug engaging the inner side of the back wall of the pocket to hold the lug and rim approximately in final position of alignment during assembly, a second rim mounted on the spoke ends against the outer ends of the spacer elements, and clamping wedges engaging the side walls of the pockets and the rim.

5. A dual wheel comprising a hub, spokes radiating from said hub, said spokes having beveled seats formed at one side of the ends thereof and pockets formed at the side opposite the seats, an inner rim mounted on the beveled seats, a spacer element positioned at each spoke end, said element having a shoulder abutting the inner rim, a tongue extending under the edge of the rim, a depending lug engaging the inner side of the back wall of the pocket to hold the lug and rim approximately in final position of alignment during assembly, and an apertured depending portion extending into the pocket, a clamping bolt extending outwardly from the pocket and through the apertured portion of the spacing element, a second rim mounted on the spoke ends against the outer ends of the spacer elements, and clamping wedges engaging the side walls of the pockets and the rim being secured in said position by the clamping bolts.

ALFRED KRIEG.
JAMES A. BUNDY.